(12) United States Patent
Pettigrew et al.

(10) Patent No.: US 8,220,198 B2
(45) Date of Patent: Jul. 17, 2012

(54) PEEL-AND-PLACE PELLET RODENTICIDE DELIVERY DISPENSER

(75) Inventors: Matthew Pettigrew, York, PA (US); Peter Everett, Collinsville, CT (US); Steven Polisoto, Lancaster, PA (US)

(73) Assignee: Woodstream Corporation, Litiz, PA (US)

( * ) Notice: Subject to any disclaimer, the term of this patent is extended or adjusted under 35 U.S.C. 154(b) by 1076 days.

(21) Appl. No.: 12/155,664

(22) Filed: Jun. 6, 2008

(65) Prior Publication Data

US 2008/0313952 A1    Dec. 25, 2008

Related U.S. Application Data

(60) Provisional application No. 60/924,949, filed on Jun. 6, 2007.

(51) Int. Cl.
*A01M 1/20* (2006.01)

(52) U.S. Cl. .......................... 43/131; 43/132.1

(58) Field of Classification Search ................ 43/131, 43/132.1, 107, 121
See application file for complete search history.

(56) References Cited

U.S. PATENT DOCUMENTS

| | | | | |
|---|---|---|---|---|
| 5,548,922 A | * | 8/1996 | Wefler | 43/131 |
| 6,216,384 B1 | * | 4/2001 | Dickson et al. | 43/131 |
| 6,618,983 B1 | * | 9/2003 | Spragins | 43/107 |
| 6,651,378 B2 | * | 11/2003 | Baker | 43/131 |
| 2004/0134121 A1 | * | 7/2004 | Bianchini et al. | 43/131 |
| 2010/0319239 A1 | * | 12/2010 | Kirkland et al. | 43/131 |

* cited by examiner

*Primary Examiner* — Christopher P Ellis
(74) *Attorney, Agent, or Firm* — Jacobson Holman PLLC

(57) ABSTRACT

A dispenser for poisoned bait having a tray and a correspondingly shaped sheet-like lid for sealing the tray with the bait placed therein during manufacture. The lid has a tear-off portion that allows the pest to access the bait while the remainder of the lid continues to cover the enclosed bait so that the user's potential for physical contact with the bait is minimized. The tray includes a gripping flange adjacent the enclosed portion of the tray that allows the user to securely grasp the dispenser and place it into position in a tight or difficult-to-reach space without risk of touching the bait.

18 Claims, 6 Drawing Sheets

US 8,220,198 B2

PEEL-AND-PLACE PELLET RODENTICIDE DELIVERY DISPENSER

This application is entitled to and hereby claims the priority of U.S. Provisional application Ser. No. 60/924,949 filed Jun. 6, 2007.

BACKGROUND OF THE INVENTION

1. Field of the Invention

The present invention is related to the field of pest extermination and, more particularly, to a dispenser for poisoned bait that protects the consumer from contact with the bait while at the same time enclosing the bait in an easy-to-use and affordable bait containment, handling and delivery dispenser.

2. Description of the Related Art

Poisonous baits are well known for use in exterminating pests such as mice and rats. These baits must be placed in strategic locations in order to maximize the likelihood of contact by the target pest. Many of these locations are necessarily small as rodents are known to prefer tight spaces that provide them with a feeling of security. Placing the baits in such locations can be difficult and consumers attempting to do so often come into contact with the bait. Consumer studies have shown that such contact is viewed as highly undesirable, prompting users to seek out bait delivery systems that ensure a "no touch" or "hands-free" freedom from exposure to the bait.

SUMMARY OF THE INVENTION

In view of the foregoing, one object of the present invention is to overcome the difficulties of placing bait delivery systems into tight locations without touching the bait by providing bait in a bait dispenser that is configured to be easy to handle and place.

Another object of the present invention is to provide a bait dispenser that is ergonomically designed to facilitate the user's safety including safe opening, carrying and placement of the dispenser for use without touching the bait.

A further object of the present invention is to provide a bait dispenser configured to make the bait readily available to the pest while, at the same time, minimizing the user's exposure to the bait as well as scattering of the bait outside the dispenser by the pest.

Yet another object of the present invention is to provide a bait dispenser that is easy to use and economically disposable once the bait is gone or no longer being consumed.

In accordance with these and other objects, the present invention is directed to a bait dispenser having a tray and a correspondingly shaped lid for sealing the tray into which poisoned bait pellets are placed during manufacture. The tray is shaped to include a gripping flange that allows the user to securely grasp the dispenser and place it into position in a tight or difficult to reach space. The lid includes a perforated portion that is removed to expose the bait. The remainder of the lid remains sealed to the tray to minimize any likelihood of the bait touching the user at any time during the opening and placement process. Finally, the inner surface of the tray includes raised ridges or other patterned surface that serves to trap small particles and minimize scattering of the bait outside the dispenser by the pest.

The foregoing objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
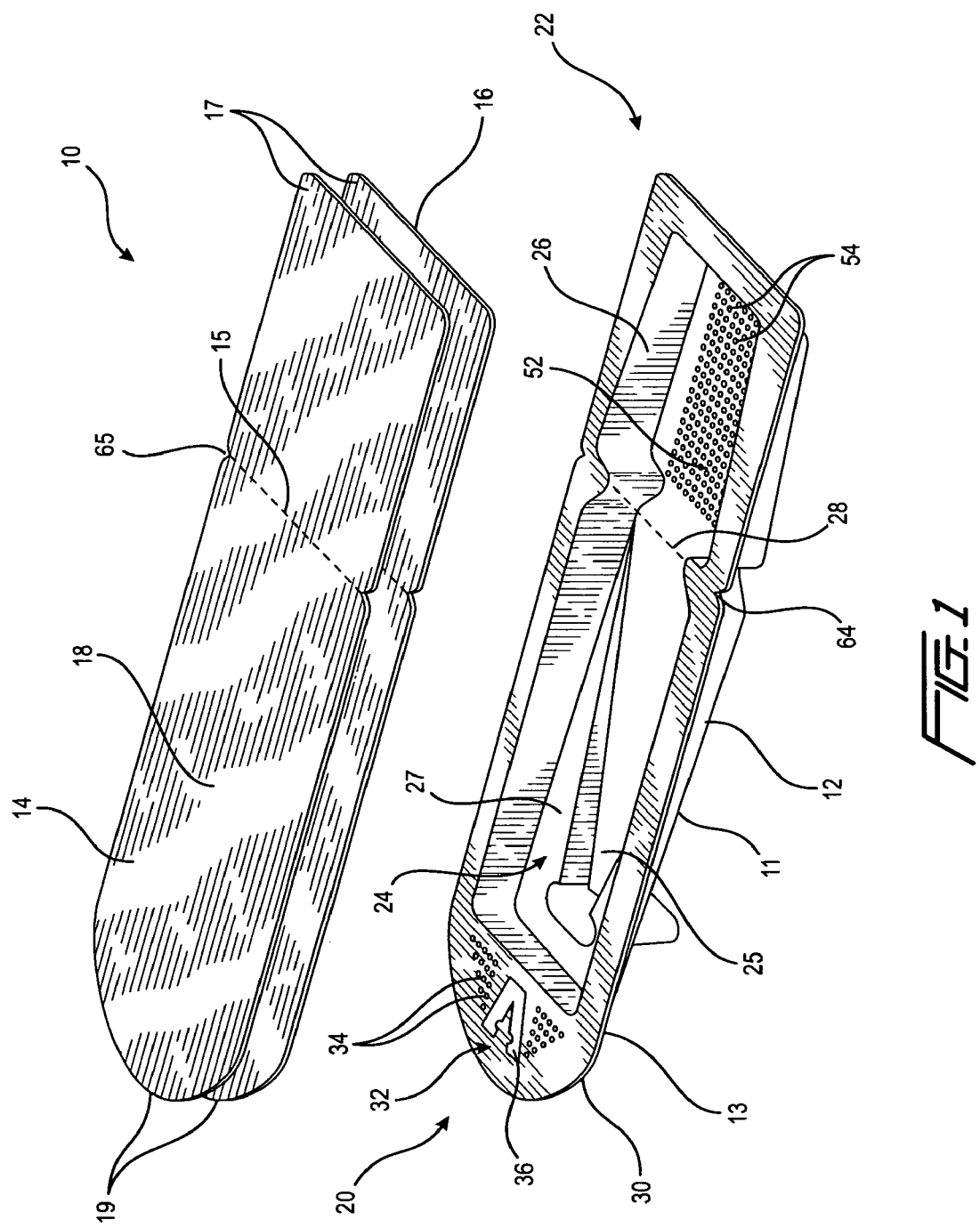
FIG. 1 is an exploded perspective view of a bait dispenser having a tray and lid in accordance with a first embodiment of the present invention.
Figure 2:
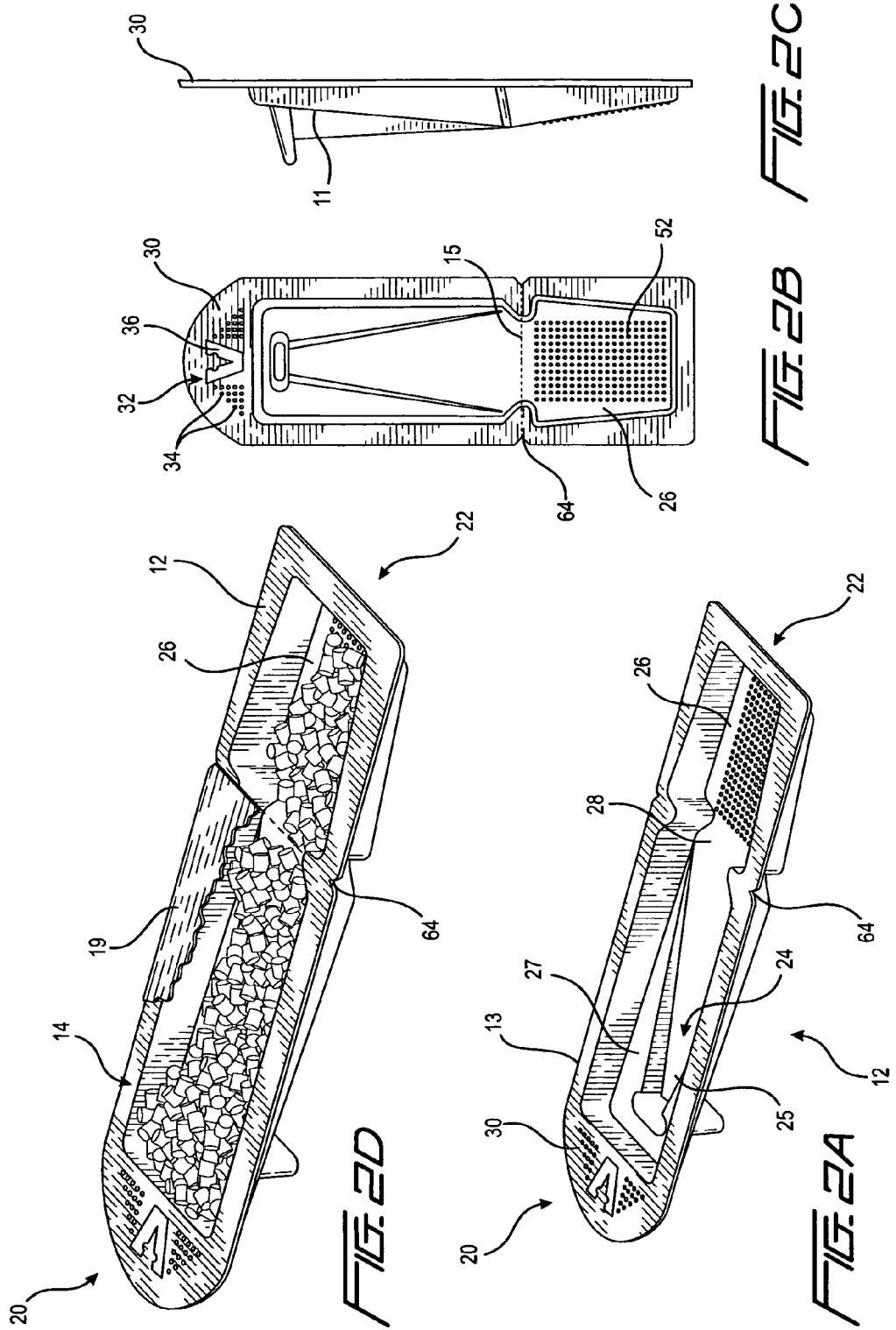
FIG. 2A is a perspective view of the tray of FIG. 1.
FIG. 2B is a top view of the tray of FIG. 2A.
FIG. 2C is a side view of the tray of FIG. 2A.
FIG. 2D is a perspective view of the dispenser of FIG. 1, shown when in use, with the tear-off portion of the lid removed and being filled with bait.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIGS. 1, 2A, 2B, 2C and 2D, a first embodiment of the present invention includes a bait dispenser, generally designated by the reference numeral 10, having an elongated tray 12 and a flat, sheet-like lid 14 corresponding in shape with the periphery of the tray 12. The lid 14 as shown has a dual layer construction with a bottom layer 16 and a top layer 18. The layers 16, 18 are adhered to one another and sealed along an outer edge of the tray 12. Alternatively, the lid 14 may be made of a single layer such as, for example, a thin paperboard material. When the dispenser 10 is in the sealed configuration prior to use, the tray 12 is filled with an appropriate rodenticide. The composition of the rodenticide does not form a part of this invention; any rodenticide composition which can be dispensed in the manner disclosed herein is suitable for the present invention.

The top layer 18, or the lid as a whole in the single layer embodiment, is provided with a perforation line 15 that extends transversely across the lid 14. The bottom layer 16 is unperforated and is typically made of a thin non-absorbent material, such as plastic sheeting or foil, to provide a sealed moisture barrier for the bait. The perforated top layer 18, or the lid as a whole in the single layer embodiment, is generally made of a paper-based material that remains structurally stable even when perforated but can be torn along the perforation 15 for easy removal of a tear-off portion 17 of the lid. The lid remainder 19 remains sealed to the tray 12 throughout use of the dispenser.

The dispenser 10 has a first end generally designated by the reference numeral 20 and a second end generally designated by the reference numeral 22. A longitudinally elongated bait holding cavity 24 adjacent the first end 20 extends in line with a bait access area 26 adjacent the second end 22. The line of interface 28 between the cavity 24 and the access area 26 is in alignment with the perforation line 15 in the lid 14. Therefore, when the tear-off portion 17 of the lid is removed along the perforation line 15, the bait access area 26 is exposed while the bait holding cavity 24 remains covered by the lid remainder 19. This protects the user from unwanted contact with the bait and also minimizes the risk of bait spillage during placement of the dispenser. According to a preferred embodiment, the length of the bait access area 26 that is uncovered when the tear-off portion 17 is removed is less than the length of the bait holding cavity that remains covered.

A bottom surface 11 of the tray 12 slopes from the first end 20 to the second end 22 to provide gravity feed of the bait from the cavity 24 to the bait access area 26. The bait holding cavity 24 can include a central elongated, outwardly tapering trough 25 surrounded by a ledge 27 which has a greater downward slope than the trough 25. This configuration serves to further aid the gravity feed and control of the bait pellets into the bait access area 26.

Figure 3:
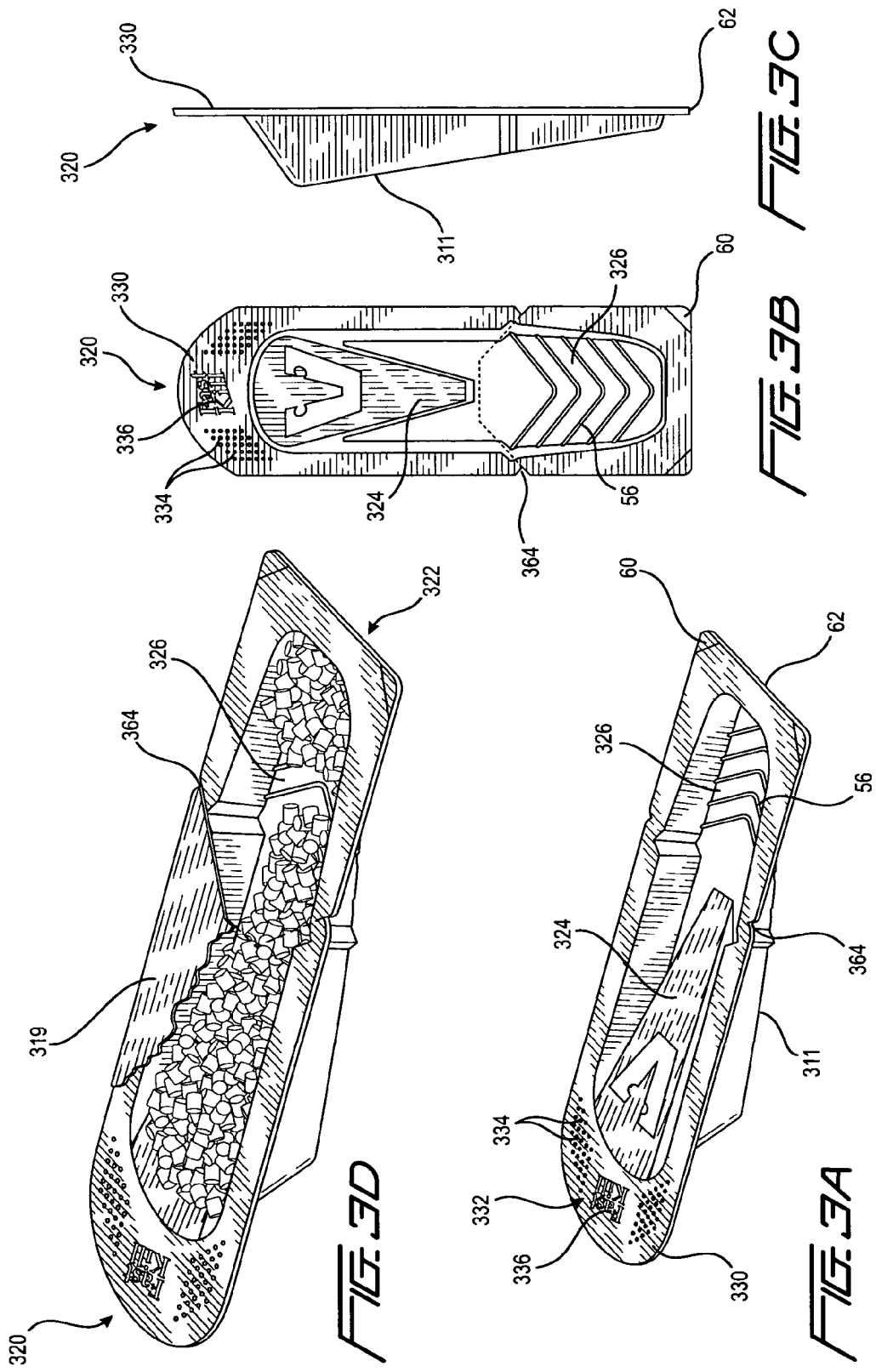
FIG. 3A is a perspective view of a tray for a bait dispenser according to a second embodiment of the present invention.
FIG. 3B is a top view of the tray of FIG. 3A.
FIG. 3C is a side view of the tray of FIG. 3A.
FIG. 3D is a perspective view of the tray of FIG. 3A, shown when in use, with the tear-off portion of the lid removed and being filled with bait.
Figure 4:
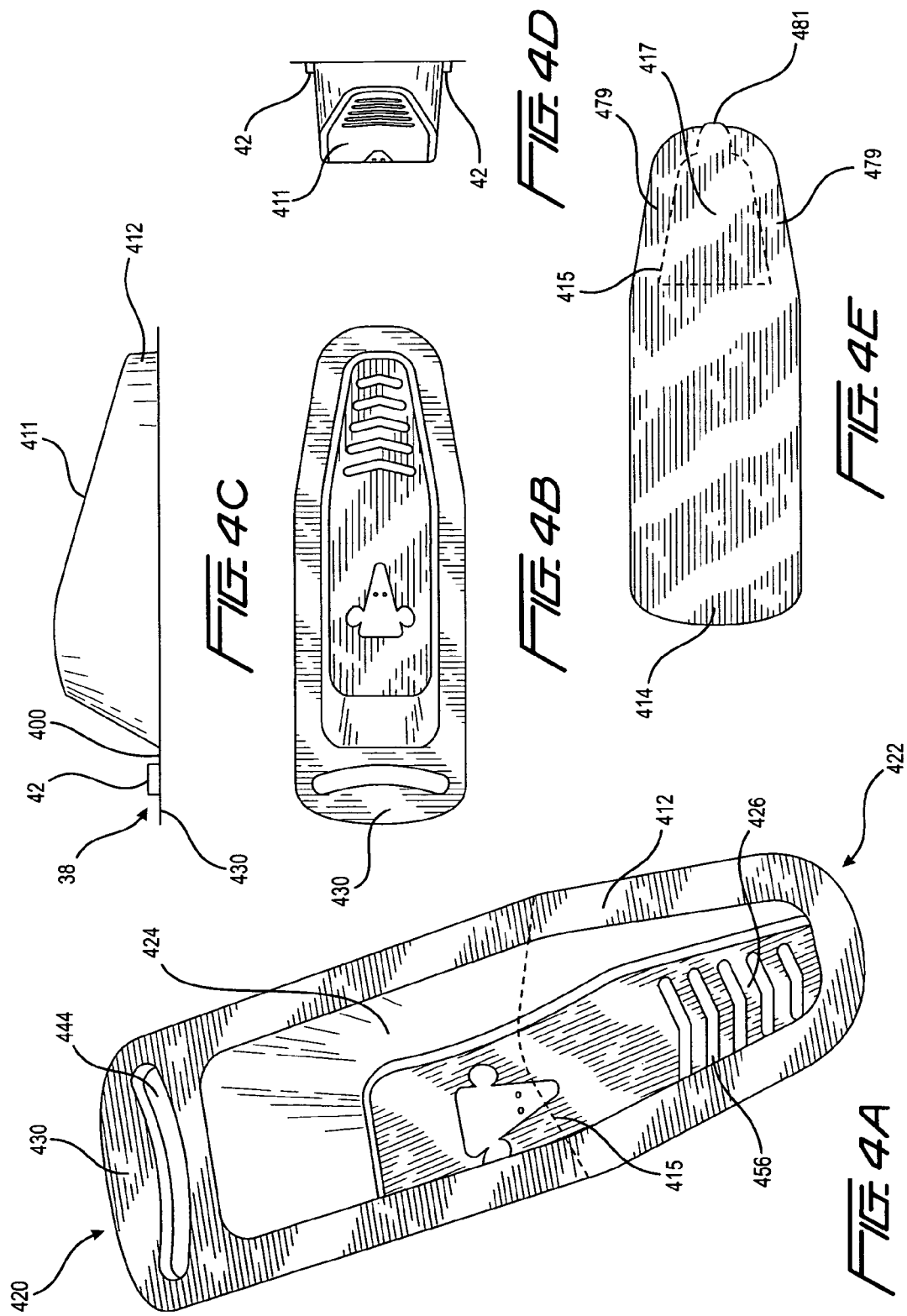
FIG. 4A is a perspective view of a bait dispenser according to a third embodiment of the present invention, with the tear-off portion of the lid removed.
FIG. 4B is a bottom view of the tray for the dispenser of FIG. 4A.
FIG. 4C is a side view of the tray of FIG. 4B.
FIG. 4D is an end view of the tray of FIG. 4B.
FIG. 4E is a top view of an alternative lid for the tray of FIG. 4B.

Further embodiments of the tray and lid of dispensers in accordance with the present invention are set forth in FIGS. 3A-3D, 4A-4D and 5A-5D. In each of these embodiments, the foregoing components including a bait cavity, bait access area, perforated lid, etc., are indicated by reference numerals corresponding to those used in FIG. 1 but differentiated by the first digit. For example, the bait cavity in FIGS. 3A, 3B and 3D is identified as 324; the bait cavity in FIGS. 4A, 4B and 4D is identified as 424, etc.

With reference to FIGS. 1 and 2A-2D, the first end 20 of the tray 12 is advantageously provided with a gripping flange 30 as part of outer edge 13 that extends outwardly from and in substantially linear alignment with the bait holding cavity 24. The gripping flange 30 preferably has a textured surface, generally designated by the reference numeral 32, that provides the user with a sure grip of the dispenser 10 during placement. The textured surface 32 may take the form of raised bumps 34 and/or alphanumeric or logo information 36 as shown in FIGS. 1, 2A, 2B, 2D, 3A, 3B and 3D. Virtually any irregularity in the surface may be used to give the user a non-slip grip of the flange.

Figure 5:
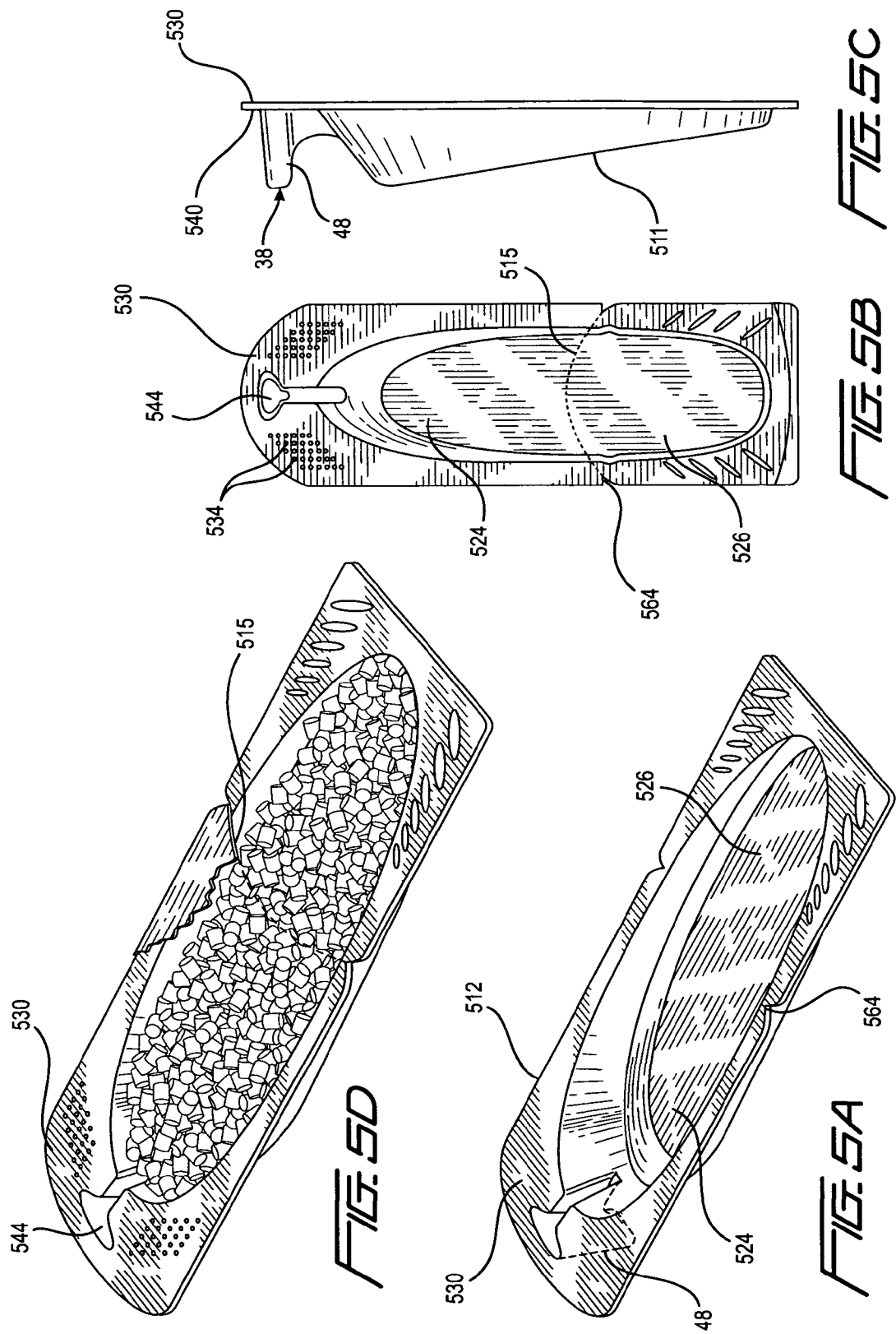
FIG. 5A is a perspective view of a tray for a bait dispenser according to a fourth embodiment of the present invention.
FIG. 5B is a top view of the tray of FIG. 5A.
FIG. 5C is a side view of the tray of FIG. 5A.
FIG. 5D is a perspective view of the tray of FIG. 5A, shown when in use, with the tear-off portion of the lid removed and being filled with bait.

Alternatively, the textured surface 32 may be combined with a protruding portion, generally designated by the reference numeral 38, on the underside 440 of the flange 430, as illustrated in FIG. 4C, and on the underside 540 of the flange 530, as illustrated in FIG. 5C. In the embodiment of FIGS. 4A-4D, the protruding portion 38 is embodied as a rib 42 that protrudes from the underside 440 and provides a corresponding indentation 444 in the upper surface 46 of the flange. FIG. 5 depicts a further alternative in which the protruding portion 38 is formed as a handle 48 with a corresponding indentation 544.

As shown in FIG. 1, a further textured surface 52 is preferably formed on the bait contact surface of the bait access area 26. This surface 52 includes bumps 54 or ridges 56 (see FIGS. 3A, 3B, 4A and 4B) that control dust and small particles to reduce scattering of the bait outside the dispenser by movement of the pest.

The textured surfaces 32, 52 and the protruding portion 38 are preferably formed integrally with the tray 12 by thermoforming technology as would be known by persons of ordinary skill in the art. The tray is preferably made of PVC but can be made of any suitable polymer or other material.

As shown in FIGS. 3A, 3B and 3D, the second end of the tray may be formed to include corner indentations or tabs 60 adjacent the outermost edge 62 that make it easier for the user to grasp the tear-off portion 17 of the lid 14 for removal thereof. Tearing off of the lid portion 17 along the perforation line 15 can also be facilitated by including notches 64 in the sides of the tray with corresponding notches 65 in the lid 14 that are aligned with the perforation line 15 across the interface 28 between the cavity 24 and the access area 26.

As shown in FIGS. 4A-4D and 5A-5D, the dispenser can be made with a sloped bottom surface 411, 511 without the trough or ledge as the sloped bottom surface 411, 511 is sufficient to provide gravity feed to the bait access area 426, 526.

FIG. 4E illustrates an alternative lid 414 for the tray 412 in which the tear-off portion 417 is removed from a center area of the lid 414 while the edge portion 479 of the lid remains sealed to the tray 412. The lid is preferably made of a single layer of paperboard that remains structurally stable even when perforated, with the tear-off portion 417 demarcated by a perforation line 415. To facilitate removal of the tear-off portion 417, the lid 414 can be provided with a tab 481 that extends beyond the outer edge of the tray for grasping of the tear-off portion.

Figure 6:
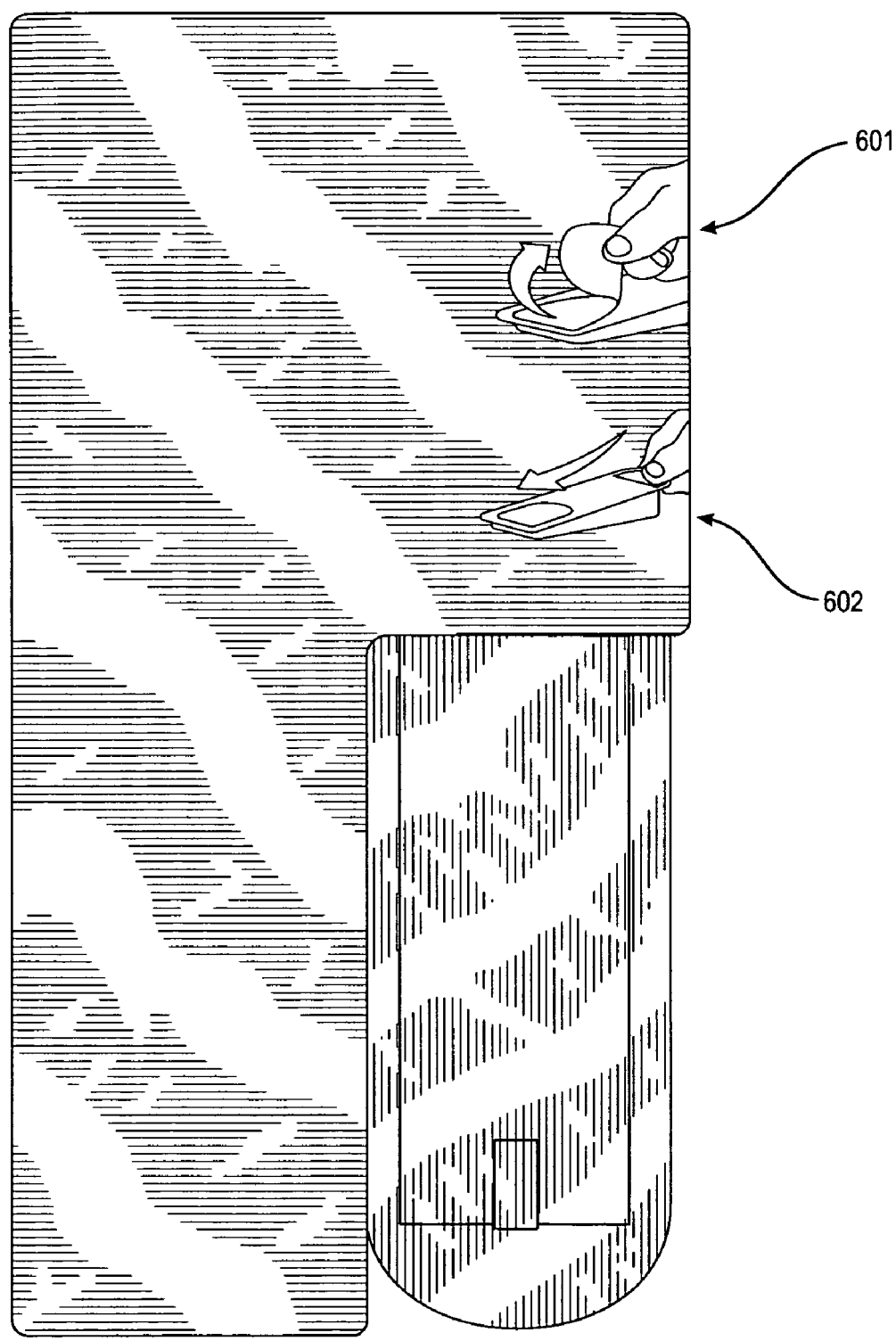
FIG. 6 illustrates a packaging cover for use with the bait dispenser embodiments according to the present invention, the cover setting forth the peel and place steps of placing such a dispenser into use.

To use the dispenser 10, a user holds the tray 12 with one hand while taking hold of the outermost edge 62 of the tear-off portion 17 and pulling upward, as shown in 601 of FIG. 6. Once the tear-off portion 17 has been removed, the user can then position and place the dispenser by holding the dispenser by the gripping flange 30, as shown in 602 of FIG. 6, as well as tip the dispenser to transfer additional bait to the bait access area 26. Because the bait is still covered within the cavity 24 by the lid remainder 19, there is no risk of the bait sliding into contact with the user's hand at the first end 20 of the dispenser 10. The gripping flange 30 also provides a secure and balanced hold on the dispenser that enables the user to confidently reach out and place the dispenser in difficult to reach and/or tight spaces without any significant risk of phyical contact with the bait in a manner not possible with prior art rodenticide delivery system configurations.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, the bait dispenser according to the present invention may be seen to be applicable to the dispensing of insect bait or any other bait offering in which user separation from the bait is desired. Therefore, it is not desired to limit the invention to the specific examples disclosed or the exact construction and operation shown and described. Rather, all suitable modifications and equivalents may be resorted to, falling within the scope of the invention.

What is claimed is:

1. A bait dispenser comprising a tray for holding a poisoned bait and a lid at least partially covering said tray, said tray having a bottom and including a bait holding cavity adjacent a first end and a bait access area adjacent a second opposite end where the dispenser is opened for use, at least a portion of said lid covering said bait holding cavity when said bait dispenser is in use, at least a portion of said tray bottom having an upper surface that slopes downwardly from said bait holding cavity to said bait access area to provide gravity feed of said bait from said bait holding cavity to said bait access area so that, when the dispenser is opened, pests are able to access and eat said bait in said bait access area.

2. The bait dispenser as set forth in claim 1, wherein the sloped upper surface of said tray bottom includes a central elongated, outwardly tapering trough in said bait holding cavity.

3. The bait dispenser as set forth in claim 2, wherein said sloped upper surface of said tray bottom further includes a ledge surrounding said trough and having a greater downward slope than said trough.

4. The bait dispenser as set forth in claim 1, wherein said tray is longitudinally elongated with a length extending between said first and second ends, said lid having a length corresponding with said tray length and including a transversely extending perforation line.

5. The bait dispenser as set forth in claim 4, wherein said perforation line is in alignment with a transverse interface between said bait holding cavity and said bait access area.

6. The bait dispenser as set forth in claim 4, wherein a portion of said lid covering said bait holding cavity is larger than a portion of said lid covering said bait access area, said portion of said lid covering said bait access area being removed prior to use of said dispenser by tearing said lid along said perforation to expose bait located in said bait access area so that pests can eat said bait without entering said dispenser.

7. The bait dispenser as set forth in claim 6, wherein said lid further includes notches at each end of said perforation line adjacent longitudinally extending sides of said tray to facilitate removal of said bait access area covering portion of said lid, said tray also having notches in alignment with said lid notches.

8. The bait dispenser as set forth in claim 1, wherein said tray is longitudinally elongated with a length extending between said first and second ends, said lid having a length substantially corresponding with said tray length and including a perforation line with a transversely extending portion and two longitudinally extending portions that intersect at one end with said transversely extending portion and extend at their opposite ends to an edge of the lid to define a lid tear-off portion that is removed to expose the bait access area prior to use.

9. The bait dispenser as set forth in claim 1, wherein said first end includes a gripping flange that extends outwardly from and in substantially linear alignment with said bait holding cavity.

10. The bait dispenser as set forth in claim 9, wherein said gripping flange has a textured surface.

11. The bait dispenser as set forth in claim 9, wherein said gripping flange includes a protruding portion on a lower surface thereof.

12. The bait dispenser as set forth in claim 1, wherein said tray bottom in the bait access area has a textured upper surface.

13. A bait dispenser comprising:
a longitudinally elongated bait holding tray having a bottom and upwardly directed sides, at least a portion of said bottom sloping downwardly from a bait holding area adjacent a first end of said tray to a bait access area adjacent a second end of said tray;
a pelletized bait held within said tray, said sloped bottom providing for gravity feed of said bait from the bait holding area to said bait access area where pests have access to eat that portion of the bait located in said bait access area; and
a lid sealed to upper edges of said tray sides to sealingly enclose said pelletized bait when said dispenser is in a storage configuration, said lid including a tear-off portion that is removed prior to use of the dispenser to open the bait access area and expose bait held therein while a remainder of said lid remains in place and covers said bait holding area when said bait dispenser is in use.

14. The bait dispenser as set forth in claim 13, wherein said tray bottom includes a central elongated, outwardly tapering trough in said bait holding area and a ledge surrounding said trough that has a greater downward slope than said trough.

15. The bait dispenser as set forth in claim 13, wherein said tray is longitudinally elongated with a length extending between said first and second ends, said lid having a length substantially corresponding with said tray length and including a perforation line with a transversely extending portion and two longitudinally extending portions that intersect at one end with said transversely extending portion and extend at their opposite ends to an edge of the lid to define said lid tear-off portion that is removed to expose the bait access area prior to use so that pests can access and eat the bait contained in said bait access area without entering said dispenser.

16. The bait dispenser as set forth in claim 15, wherein said lid remainder covering said bait holding area is larger than said tear-off portion.

17. The bait dispenser as set forth in claim 13, wherein said first end includes a gripping flange that extends outwardly from and in substantially linear alignment with said bait holding area, said gripping flange having a protruding portion on a lower surface thereof to provide a user with a secure grip.

18. The bait dispenser as set forth in claim 15, wherein said lid tear-off portion includes a tab that projects beyond said tray length for grasping of said tear-off portion.

* * * * *